United States Patent [19]
Kazama et al.

[11] 4,345,944
[45] Aug. 24, 1982

[54] CEMENT ADDITIVE

[75] Inventors: Yoshiteru Kazama; Isao Kokubo; Akitoshi Tsuji; Yukio Tanino, all of Wakayama, Japan

[73] Assignee: Kao Soap Co., Ltd., Tokyo, Japan

[21] Appl. No.: 244,405

[22] Filed: Mar. 16, 1981

[30] Foreign Application Priority Data

Mar. 31, 1980 [JP] Japan .................. 55-41384

[51] Int. Cl.³ .............................. C04B 7/35
[52] U.S. Cl. ......................... 106/90; 106/314
[58] Field of Search ............... 106/90, 97, 98, 314

[56] References Cited

U.S. PATENT DOCUMENTS 4,284,433  8/1981  Aignesberger et al. .............. 106/90

Primary Examiner—James Poer
Attorney, Agent, or Firm—Blanchard, Flynn, Thiel, Boutell & Tanis

[57] ABSTRACT

An additive for cement comprising a granular molded product formed of a water-reducing agent composed mainly of a naphthalenesulfonic acid/formaldehyde high condensate (NSF) or salt thereof, and a carrier.

8 Claims, No Drawings

CEMENT ADDITIVE

The present invention relates to an additive for mixing with hydraulic cement and to a composition comprising a mixture of hydraulic cement and that additive. More particularly, the present invention relates to an additive which is useful as a high-range water-reducing agent and as a slump loss-preventing agent for making concrete.

Various high-range water-reducing agents are known. A naphthalenesulfonic acid/formaldehyde high condensate (hereinafter referred to as "NSF") is a high-range water-reducing agent (super-plasticizer) which is indispensable for the manufacture of high-strength concrete. Around 1971 in West Germany, a so-called "fluid concrete" was developed for improving the processability of concrete of dry consistency (relatively low water content) by effectively utilizing this high-range water-reducing agent. The application fields for this type of concrete have been markedly expanded since then. According to this technique, there is adopted a so-called post addition or delayed addition method in which the water-reducing agent is added after contacting the cement with water (see Japanese Patent Application Laid-Open Specification No. 105316/76). This method is advantageous in comparison with the conventional addition method (wherein the cement and the water-reducing agent are simultaneously contacted with water) in various points. For example, the slump value of the concrete after kneading is remarkably increased and concrete of excellent flowability can be obtained. Furthermore, the amount of the water-reducing agent can be reduced by about 40% as compared with the amount of the water-reducing agent required for obtaining the same slump value at the same water reduction ratio in the conventional method. However, this method involves the troublesome operation of adding the water-reducing agent after a certain time has passed from the time of initial contact of the cement with the water. As a method for preventing slump loss by using an aqueous solution of NSF, there is known a technique for maintaining the flowability of the concrete for a long time by adding the water-reducing agent, in divided portions, at two or more times (see Japanese Patent Application Laid-Open Specification No. 15856/76). This method, however, involves the very complicated and troublesome operation of measuring the slump value of the concrete, determining the amount of the water-reducing agent to be added, based on the measured slump value, metering the water-reducing agent and adding the water-reducing agent repeatedly.

As disclosed in Japanese Patent Publication No. 11737/66 and Canadian Pat. No. 723 206, a salt of NSF is prepared by sulfonating naphthalene with sulfuric acid, adding formaldehyde to the sulfonation product and performing condensation. A large quantity of sulfuric acid is present in the condensation product and the inorganic salt formed by neutralization of the condensation product can scarcely be separated therefrom. Athough it is permissible to use an aqueous solution of the condensate containing the inorganic salt, as it is, as a water-reducing agent for cement, there arises the problem of precipitation of the inorganic salt in the aqueous solution caused by a change of the ambient temperature or the like. Furthermore, although it is permissible to form a powder by spray-drying such an aqueous solution of NSF, because a large quantity of energy is necessary for evaporating the water, the cost of the water-reducing agent is increased.

We have investigated with a view to solving these problems and, as the result, we succeeded in developing a cement additive having great practical utility and which can be prepared very simply. More specifically, we discovered that when a cement additive is formed by adding a carrier to NSF or its salt, which is a water-reducing agent having a high capacity, and molding the mixture of carrier and NSF or its salt into granules, and incorporating those granules, as an additive, into cement or a cement composition, even according to the conventional addition method, a selectable flowability can be manifested in the concrete for a selectable time (this effect will be called "time-differential manifestation effect"). We have now completed the present invention based on this finding.

In this present invention, a cement additive which exerts a very high time-differential manifestation effect after a certain mixing time (ordinarily 1 to 3 minutes) is called a "high-range water-reducing agent", and a cement additive which exerts an effect of maintaining a certain flowability for 60 to 120 minutes after kneading is called a "slump loss-preventing agent".

When CaO is added, as a carrier, to a high-range water-reducing agent, for example, NSF (acidic aqueous solution; unneutralized naphthalenesulfonic acid/-formaldehyde high condensate), a mass containing a Ca salt of NSF, mixed with Ca(OH)$_2$ and CaSO$_4$.2H$_2$O or CaSO$_4$.½H$_2$O is obtained by the neutralization reaction between CaO and the acid and/or the digestion reaction between CaO and water. If this mass is pulverized to an appropriate particle size and is incorporated in cement, the flowability of the resulting concrete differs according to this particle size. That is, it was found that the larger is the particle size, the more increased is the flowability.

When the changes of the flowability according to the particle size are examined, based on the slump values, the results shown in Table 1 are obtained.

TABLE 1

| High-Range Water-Reducing Agent | Form | Adding Method | Slump Value after 3 Minutes' Kneading |
|---|---|---|---|
| Aqueous solution of Na Salt of NSF | (42% product) | Conventional Method | 10 cm |
| Aqueous solution of Ca Salt of NSF | (42% product) | Conventional Method | 9 cm |
| Spray-dried product of Na Salt of NSF | | Conventional Method | 11 cm |
| Spray-dried product of Ca Salt of NSF | | Conventional Method | 10.5 cm |
| Granules of mixture of acid solution[2] of NSF and CaO (mixing | | | |

TABLE 1-continued

| High-Range Water-Reducing Agent | Form | Adding Method | Slump Value after 3 Minutes' Kneading |
|---|---|---|---|
| ratio = 100/25 parts by weight) | Particle size | | |
| | 0.6 mm | Conventional Method[1] | 17 cm |
| | 1.2 mm | Conventional Method[1] | 21 cm |
| | 2.5 mm | Conventional Method[1] | 22 cm |

Note
Water/Cement (W/C) = 33%, C = 450 Kg/m$^3$, ratio of addition of NSF salt, calculated as pure product = 0.75 wt. %.
[1] granules were added without being dissolved in water
[2] aqueous solution containing 43.8% of the effective component acid and 5.4% of sulfuric acid The flowability of the granular high-range water-reducing agent of the present invention is determined by its particle size. It is preferred that the particle size of the high-range water-reducing agent of the present invention is 0.3 to 40 mm, preferably 0.3 to 5 mm. If the particle size is smaller than 0.3 mm, the granular product is not different, in its effect, from a conventional spray-dried powder product of a salt of NSF free of a carrier or a conventional aqueous solution of a salt of NSF. If the particle size exceeds 40 mm, the effect is not particularly reduced but handling becomes difficult.

From the viewpoint of the flowability, it is preferred that the NSF salt content be high, for example, 10 to 98 wt. %, especially 20 to 98 wt. %. Any carrier that does not have a bad influence on cement or cement compositions can be used in the present invention. However, from the viewpoint of the ease of preparation, it is preferred to use a carrier characterized by the features that the cost of the carrier as the neutralizing agent for the aqueous solution of NSF is low, the amount necessary for neutralization is small and the water present in the aqueous acid solution can be removed (by evaporation) without using externally applied heat or the like. In view of the foregoing, it is most preferred to use CaO as the carrier. A cement additive composition, according to the invention, is formed by molding into granules a mixture consisting essentially of from 12 to 87 parts by weight of naphthalene sulfonic acid/formaldehyde high molecular weight condensate, from 88 to 13 parts by weight of CaO, together with water necessary for granulation. It also is possible to use a neutralizing agent, such as Ca(OH)$_2$, NaOH or cement, and a substance capable of retaining water of crystallization or a porous substance, in combination.

In order to facilitate granulation, it is possible to add clay. A cement additive composition, according to the invention, is formed by molding into granules a mixture consisting essentially of from 12 to 87 parts by weight of naphthalene sulfonic acid/formaldehyde high molecular weight condensate, from 44 to 7 parts by weight of CaO, from 44 to 6 parts by weight of clay, together with water necessary for granulation.

The so-called high-range water-reducing agent that exerts the highest flowability increasing effect for 3 minutes after kneading has hereinbefore been described. In the present invention, it is possible for the cement additive also to exert a predetermined flowability increasing effect for a time period of 10 to 30 minutes if an appropriate carrier, an appropriate amount of the carrier and an appropriate particle size of the granular molded product are chosen.

The slump loss-preventing agent will now be described. For example, hydraulic cement, such as Onoda Portland Cement, is added as a carrier to a salt of NSF, and if necessary, water is added. When an aqueous solution of an NSF salt is used, the water present as the solvent is used for the granulation and hydration of the cement, but if the amount of the cement is increased, it becomes necessary to add more water. The mixture is granulated into pebbles having a particle size of 5 to 40 mm by an extrusion molding machine or the like. If these pebbles are incorporated into a cement composition, such as concrete, together with cement and water, flowability can be maintained for a long time at a certain level. When the slump values are measured at 30 or 60 minutes after completion of kneading, there are obtained the results shown in Table 2.

TABLE 2

| Additive | Amount Added | Slump Just after Kneading | 30 Minutes after Kneading | 60 Minutes after Kneading |
|---|---|---|---|---|
| Aqueous solution (42 wt. %) of Na salt of NSF | 0.3% | 18.7 cm | 10.0 cm | 5.7 cm |
| Spray-dried product of Ca salt of NSF | 0.28% | 18.2 cm | 9.7 cm | 6.0 cm |
| Ca salt of NSF/cement/water (20/60/20, parts by weight) (granulation product having particle size of 10 to 20 mm) | 0.50% | 18.5 cm | 19.7 cm | 18.7 cm |

Note
W/C = 60%, S/A = 47%, C = 300 Kg/m$^3$, amount added = % of NSF salt, calculated as pure product, based on amount of cement. W is water, C is cement, S is fine aggregate and A is the sum of the fine aggregate (S) and the coarse aggregate.

The above values are those obtained when the mixing is continuously conducted. If mixing is not conducted, the slump loss-preventing effect can be maintained for a much longer time.

The flowability-retaining effect provided by the slump loss-preventing agent comprised of the granular product of the present invention is determined according to the size and strength of the granular product and the NSF content. As the NSF content is increased, the slump value after mixing is increased and the retaining effect is relatively reduced. In contrast, as the NSF content is reduced, the retaining effect is increased, although the slump value after mixing is reduced. Accordingly, it is preferred that the content of NSF or its salt in the additive be 10 to 60 wt. %.

It is preferred that the particle size of the granular product be 5 to 40 mm. In order to meter the granular product, together with fine aggregate and coarse aggregate to be incorporated into a concrete composition, it is especially preferred that the particle size of the granular product be 5 to 25 mm.

The carrier that is used in the present invention can be a substance that is capable of forming strong granules when this substance is mixed with NSF or its salt, then the water necessary for granulation is added and the mixture is molded into a granular product, or the carrier may be a substance for which NSF or its salt can act as a binder (for example, active carbon).

From many experiments made by us, it was confirmed that the following substances can be used as the carrier. As the carrier of the first type, there can be mentioned hydraulically hardenable substances and non-hydraulically hardenable substances, such as cements (ordinary Portland cement, high-early-strength cement, alumina cement, blast furnace cement, silica cement, fly ash cement and special cement [Σ1000 manufactured and supplied by Denki Kagaku Kogyo K.K. and jet cement manufactured and supplied by Onoda Cement K.K.], and gypsum ($CaSO_4$ or $\alpha$- or $\beta$-type $CaSO_4 \cdot \frac{1}{2}H_2O$) and slaked lime. As the carrier of the second type, there can be mentioned substances capable of retaining water of crystallization. For example, $Na_2B_4O_7$, $Na_2SiO_3$, $Al(SO_4)_3$, $FeSO_4$ and $Na_2SO_4$ (compounds free of water of crystallization are set forth, but of course, those including water of crystallization can similarly be used) are preferably used. Furthermore, $Fe_3O_4$, $K_2CO_3$, $FeCO_3$, $Na_2CO_3$, $CaS_2O_3$, $ZnSO_4$, $NH_4Al(SO_4)_2$, $NaAl(SO_4)_2$ and $Na_2HPO_4$ (the water of crystallization is omitted in each compound) and other salts can be used.

Some of these salts have a flash setting effect, a high early strength effect or a retarding effect to cement. An appropriate salt is optionally chosen and used according to the desired properties for the final concrete product.

As the carrier of the third type, there can be mentioned porous substances and water-insoluble substances. These substances not only act as agents for adjusting and controlling the slump loss-preventing effect, but also for exerting a granulation-promoting effect and an effect of adjusting the strength of the granular product. For example, there can be mentioned clay, active carbon, zeolites, $SiO_2$, sintered rock-forming minerals and sintered fly ash. These substances are effective as the carrier for a slump loss-preventing agent.

From the economical viewpoint and in view of the requirement that bad influences should not be exerted on the physical properties of the concrete product, it is preferred to use, as the carrier, a carrier having a chemical composition similar to that of cement. More specifically, it is preferred to use cheap gypsum contained in cement and such cements as are described above. When cement is used as the carrier, all of the above-mentioned cements may be employed. It is especially preferred that relatively cheap, conventional, Portland cement be used as the carrier. In order to accelerate the granulation, it is preferred to use high-early-strength cements, such as alumina cement, ultra-high-early strength cement, jet cement and the like, singly or in combination. Another advantage attained by the use of cement is that the cement is effective as an agent for neutralizing an unneutralized aqueous solution of NSF and the water present in the unneutralized aqueous solution of NSF is removed in the form of combined water.

The output of gypsum has increased in recent years and the output of gypsum manufactured in the process of the flue gas treatment or desulfurization is especially increased. This gypsum is produced in excessive quantities at the present time and vigorous attempts are being made to utilize this gypsum effectively.

Among hydraulically hardenable substances, gypsum is cheapest and is a readily available by-product. We investigated various kinds of gypsum in connection with their effect on the slump loss-preventing agent. As the result, it was found that $\beta$-type $CaSO_4 \cdot \frac{1}{2}H_2O$, $\alpha$-type $CaSO_4 \cdot \frac{1}{2}H_2O$ and $CaSO_4$ are effective and that $\beta$-type $CaSO_4 \cdot \frac{1}{2}H_2O$ is most preferred.

In principle, a retarding water-reducing agent, a high-early-strength water-reducing agent and a standard water-reducing agent can be used as the water-reducing agent in the present invention. An NSF type water-reducing agent is a high-range water-reducing agent which is most preferred from the economical viewpoint, and this water-reducing agent is most appropriate in the present invention.

NSF or its salt is used as the water-reducing agent in the present invention. Other water-reducing agents can be used in combination with NSF or its salt, in an amount of up to 100 parts by weight per 100 parts by weight of NSF or its salt. If sodium gluconate, which is commonly used as a cement additive, is mixed with a carrier and molded into granules, the intended effect of the present invention cannot be attained. However, if sodium gluconate is used in combination of NSF or its salt, the intended effect can be obtained if the amount of sodium gluconate is within the above-mentioned range.

NSF obtained by sulfonating naphthalene and condensing the sulfonation product with an aldehyde, such as formaldehyde, in the presence of sulfuric acid, is preferably used in the present invention. A product obtained by neutralizing the reaction product containing residual sulfuric acid still contains some sulfuric acid, and liming and sodation are ordinarily carried out to remove the sulfuric acid as a salt. This product is used in the salt-containing state in some cases. Accordingly, if a large quantity of sulfuric acid is used for the reaction, a high load is imposed on the treatment step or various troubles occur, such as precipitation of a sulfuric acid salt. When NSF is used in the granular form according to the present invention, these problems become insignificant and need not be taken into account.

A copolycondensate prepared from naphthalenesulfonic acid and a substance copolycondensable therewith can be used. As the copolycondensable substance, there can be mentioned, for example, substituted aromatic compounds such as alkylnaphthalenes, phenols, anthracene, xylene, benzene, lignin, creosote oil and sulfonation products thereof, and amino compounds such as melamine, urea and derivatives thereof. As the cation forming a salt with NSF, there can be mentioned, for example, Na, Ca, K, $NH_4$, monoethanolamine, diethanolamine and triethanolamine.

In using the cement additive of the present invention, NSF or its salt is ordinarily used in an amount of 0.2 to 2% by weight, calculated as the pure component, based on the cement with which the additive is mixed. Ordinarily, NSF or its salt is added to the cement in advance or is incorporated and kneaded in a cement composition. The cement additive may also be added during kneading or at an appropriate time after kneading.

The present invention will now be described in detail with reference to the following illustrative Examples that by no means limit the scope of the present invention.

Incidentally, Example 1 illustrates a high-range water-reducing agent, Example 2 illustrates a slump loss-preventing agent, and Example 3 illustrates a combined high-range water-reducing and slump loss-preventing agent.

EXAMPLE 1

(1) Preparation of Additives

Additive (A). To 1000 g of an unneutralized aqueous solution of NSF (effective acid content=42.3 wt. %) there was added 300 g of CaO, and the mixture was stirred by a mixer. The water in the NSF solution was evaporated by vigorous hydration and neutralization accompanied by generation of heat.

The obtained granules were pulverized and classified by standard sieves of JIS Z-8801 to collect particles having a particle size of from 1190 to 2380μ, and the thus-recovered granules were used for the tests described below. The content of the Ca salt of NSF was 50 wt. %, and the remainder of the components were $Ca(OH)_2$, $CaSO_4 \cdot \frac{1}{2}H_2O$, $CaSO_4 \cdot 2H_2O$ and a small amount of free water.

Additive (B). To 1000 g of an unneutralized aqueous solution of NSF (effective acid content=42.3 wt. %) there were added 327 g of CaO and 164 g of clay, and the mixture was stirred by a mixer. The water in the NSF solution was evaporated by vigorous hydration and neutralization accompanied by generation of heat. The obtained granules were pulverized and classified by standard sieves of JIS Z-8801 to collect particles having a particle size of from 2380 to 1190μ. The thus-recovered granules were used for the tests. The content of the Ca salt of NSF in the granules was 38 wt. %, and the remainder of the components were $Ca(OH)_2$, $CaSO_4 \cdot 2H_2O$, $CaSO_4 \cdot \frac{1}{2}H_2O$, clay and free water.

Additive (C). To 1000 g of an unneutralized aqueous solution of NSF (effective acid content=42.3 wt. %) there were added and mixed 80 g of CaO, 150 g of clay, 2850 g of conventional Portland cement supplied by Onoda Cement K.K., 400 g of water and 650 g of a powder of a Ca salt of NSF (having a size smaller than 300μ) to form a paste. The paste was dried by hot air and the dry product was pulverized to collect particles left on standard sieves of JIS Z-8801 having a particle size of from 1190 to 297 μ. The recovered granules were used for the tests. The content of the Ca salt of NSF in the granule was 25.8 wt. %.

For comparison, an aqueous solution of an Na salt of NSF and spray-dried products of Ca and Na salts were used for the tests.

(2) Components of Concrete

The following components were used.

Cement:
Ordinary Portland cement supplied by Onoda Cement K.K.

Fine aggregate:
Fine aggregate produced at Kinokawa and having a size smaller than 5 mm.

Coarse aggregate:
Pulverized stone produced at Takarazuka and having a size smaller than 20 mm.

(3) Concrete Kneading and Testing Methods

The components were charged in such amounts that the amount of the kneaded mixture was 40 l, and the mixture was kneaded for 2 minutes in a mixer of the forced agitation type at a rotation speed of 75 rpm (normal rotation speed). The coarse aggregate, fine aggregate, cement and water-reducing agent were simultaneously added. Curing of the sample was carried out according to the standard curing method. The obtained results are shown in Table 3. From the results shown in Table 3, it is seen that in the case of the product according to the present invention, the water reduction ratio is remarkably increased and also the strength is increased.

TABLE 3

| Kind Comparison | Additive Form | Amount* | W/C % | S/A % | C Kg/m³ | Air Amount (%) |
|---|---|---|---|---|---|---|
| — | — | — | 35.4 | 44.0 | 500 | 2.0 |
| NSF-Na | 42% aqueous solution | 0.5 | 30.4 | 43.0 | 500 | 1.9 |
| NSF-Na | spray-dried product | 0.5 | 29.8 | 43.0 | 500 | 1.7 |
| NSF-Ca | spray-dried product | 0.5 | 29.8 | 43.0 | 500 | 1.8 |
| Present Invention | Particle Size Range | | | | | |
| A | 1190–2380 μ | 0.5 | 27.8 | 43.0 | 500 | 1.9 |
| B | 1190–2380 μ | 0.5 | 28.2 | 43.0 | 500 | 1.7 |
| C | 297–1190 μ | 0.5 | 28.6 | 43.0 | 500 | 1.8 |

| Kind Comparison | Water Reduction Ratio (%)** | Slump (cm) | Compression Strength (Kg/cm²) σ 1 | σ 7 | σ 28 |
|---|---|---|---|---|---|
| — | 0 | 4.6 | 230 | 450 | 678 |
| NSF-Na | 14.0 (100) | 4.7 | 282 | 637 | 791 |
| NSF-Na | 15.8 (113) | 4.8 | 295 | 650 | 785 |
| NSF-Ca | 15.8 (113) | 4.5 | 290 | 642 | 782 |
| Present Invention | | | | | |
| A | 21.5 (154) | 4.9 | 375 | 718 | 830 |
| B | 20.0 (143) | 4.7 | 370 | 712 | 829 |
| C | 19.2 (137) | 4.4 | 320 | 690 | 800 |

Note
*% by weight of the NSF salt, calculated as the effective component, based on the cement.
**each parenthesized value is a relative value calculated based on the arbitrary designation that the water reduction ratio obtained by using a 42% aqueous solution of NSF-Na is 100.

In a modification of Example 1, the amounts added of the respective water-reducing agent were adjusted so that the respective slumps were substantially equal, while W/C was kept constant at 30.4%. The obtained results are shown in Table 4.

product was air-dried. The content of the Ca salt of NSF in the dry, hardened, product was 29.8 wt. %.

TABLE 4

| Additive | Amount (g) | Apparent Amount Added (%) | Slump (cm) | Air Amount (%) | Compression Strength (Kg/cm$^2$) | | |
|---|---|---|---|---|---|---|---|
| | | | | | $\sigma$ 1 | $\sigma$ 7 | $\sigma$ 28 |
| NSF-Na aqueous solution (comparison) | 0.5 (100) | 1.2 (100) | 4.7 | 1.9 | 282 | 637 | 791 |
| A (invention) | 0.24 (48) | 0.48 (40) | 4.5 | 1.7 | 280 | 640 | 788 |
| B (invention) | 0.28 (56) | 0.74 (61) | 4.3 | 1.8 | 279 | 635 | 790 |

Note
Each parenthesized value is a relative value calculated based on the arbitrary designation that the value obtained by using the NSF-Na aqueous solution is 100.

From the results shown in Table 4, it is seen that when the additive of the present invention is used, even if the amount added thereof is drastically reduced, no particular disadvantage is caused. The apparent amount added means the total amount of the water-reducing agent and the accompanying water and carrier.

EXAMPLE 2

(1) Preparation of Additives

Additive (D). In a mortar mixer, 212 g of a powder of an Na salt of NSF, 606 g of ordinary Portland cement supplied by Onoda Cement K.K. and 182 g of water were kneaded for 5 minutes, and the mixture was molded into spherical products having a size of 10 to 20 mm by an extrusion molding machine and the spherical hardened product was dried by hot air. The content of the Ca salt of NSF in the dry, hardened, product was 25.3 wt. %.

Additive (E). To 300 g of a powder of a Ca salt of NSF there were added 350 g of ordinary Portland cement supplied by Onoda Cement K.K. and 210 g of water, and the mixture was kneaded in a mortar mixer for 5 minutes and molded into spherical hardened products having a size of 10 to 15 mm by an extrusion molding machine. The hardened product was dried at 50° C. for 10 hours. The content of the Ca salt of NSF in the dry, hardened, product was 29.4 wt. %.

Additive (F). To 300 g of a power of a Ca salt of NSF there were added 350 g of Ca(OH)$_2$, 350 g of clay and 210 g of water, and the mixture was kneaded in a mortar mixer for 5 minutes and molded into spherical hardened products having a size of 15 to 20 mm. The hardened

(2) Components of Concrete

The same materials were used as in Example 1.

(3) Concrete Kneading and Testing Methods

The components were charged in such amounts that the amount of the kneaded mixture was 40 l, and the mixture was kneaded for 3 minutes in a tiltable mixer. The rotation number of the mixer was 24 rpm (normal operation rotation number). The components were simultaneously added. Kneading was conducted for 3 minutes, and then the concrete was discharged from the mixer and the slump and air amount were measured. The obtained values were designated as the values just after kneading. Then, the concrete was returned to the mixer and allowed to stand still for a predetermined time. The normal mixing operation was conducted for 0.5 minute before the concrete was discharged from the mixer after standing for the predetermined time. The elapsed time was measured from the time of initiation of contact of cement with water as the starting point. The slump was measured after 30 and 60 minutes and then a test piece was collected and cured in water, and the compression strength of the cured product was measured. The concrete temperature was adjusted to 20±2° C.

The results obtained are shown in Table 5.

From the results shown in Table 5, it is seen that the additive of the present invention can maintain the slump at a certain value for a long time without reduction of the strength.

TABLE 5

| Kind Comparison | Additive Form | Amount* (%) | W/C (%) | S/A (%) | C (Kg/m$^3$) | Air Amount (%) |
|---|---|---|---|---|---|---|
| — | — | — | 70 | 48 | 300 | 1.2 |
| β-NSF-Na salt | 42% solution | 0.3 | 63.5 | 47 | 300 | 1.0 |
| β-NSF-Na salt | spray-dried product | 0.29 | 63.5 | 47 | 300 | 1.1 |
| β-NSF-Ca salt | spray-dried product | 0.29 | 63.5 | 47 | 300 | 1.2 |
| Present Invention | Particle Size Range | | | | | |
| (D) | 10–20 mm | 0.5 | 63.5 | 47 | 300 | 1.3 |
| (E) | 10–15 mm | 0.5 | 63.5 | 47 | 300 | 1.2 |
| (F) | 15–20 mm | 0.5 | 63.5 | 47 | 300 | 1.3 |

| Kind Comparison | Properties Slump (cm) | | | Compression Strength (Kg/m$^2$) | |
|---|---|---|---|---|---|
| | just after kneading | after 30 minutes | after 60** minutes | $\sigma$ 7 | $\sigma$ 28 |
| — | 18.4 | 16.2 | 14.3 | 190 | 293 |
| β-NSF-Na salt | 18.0 | 11.4 | 5.8 (11.8) | 255 | 360 |

TABLE 5-continued

| | | | | | |
|---|---|---|---|---|---|
| β-NSF-Na salt | 18.5 | 11.9 | 6.1 (12.1) | 253 | 358 |
| β-NSF-Ca salt | 18.3 | 11.2 | 5.3 (11.3) | 252 | 346 |
| Present Invention | | | | | |
| (D) | 18.7 | 20.2 | 20.5 | 261 | 362 |
| (E) | 19.0 | 20.8 | 20.2 | 258 | 365 |
| (F) | 18.5 | 19.2 | 18.3 | 265 | 367 |

Note
*% by weight of the effective NSF salt, based on cement.
**each parenthesized value is one obtained when the total amount of the water-reducing agent was adjusted to 0.5 wt. %.

Example 3

(1) Preparation of Additives

Additive (G). To 1000 g of a 42% aqueous solution of an Na salt of NSF (90 cp at 20° C.) there was added 1000 g of anhydrous $Na_2SO_4$, and the mixture was kneaded for 5 minutes by a mixer. The kneaded mixture was molded into spherical hardened products having a size of 10 to 20 mm. The obtained composition had a specific gravity of 1.290 and a compression strength of 16.5 Kg/cm$^2$, and the content of the Na salt of NSF was 21 wt. %. This product was mixed with the granules of additive (A) of Example 1 at a weight ratio of 30/70, and the mixture was tested.

Additive H. To 100 g of a 42% aqueous solution of an Na salt of NSF (120 cp at 20° C.) there was added 370 g of anhydrous $Na_2S_2O_3$, and the mixture was kneaded for 3 minutes. The kneaded mixture was molded into spherical hardened products having a size of 10 to 20 mm. The composition had a specific gravity of 1.345 and a compression strength of 4 Kg/cm$^2$. The content of the Na salt of NSF was 30.8 wt. %. This composition was mixed with the granules of additive (B) of Example 1 at a weight ratio of 20/80. The resulting mixture was tested.

(2) Components of Concrete

The same components as used in Example 1 were used.

(3) Concrete Kneading and Testing Methods

The same methods as employed in Example 1 were adopted. The results obtained are shown in Table 6.

TABLE 6

| Additive | | | Composition | | | |
|---|---|---|---|---|---|---|
| Kind | Form | Amount* (%) | W/C (%) | S/A (%) | C (Kg/m$^3$) | Air Amount (%) |
| Comparison | | | | | | |
| — | — | — | 66.0 | 49 | 300 | 1.5 |
| Present Invention | | | | | | |
| (G) | granule | 0.40 | 60 | 48 | 300 | 1.7 |
| (H) | granule | 0.35 | 60 | 48 | 300 | 1.4 |

| | Properties | | | | | |
|---|---|---|---|---|---|---|
| | Just after knead- | Slump (cm) | | | Compression Strength (Kg/m$^2$) | |
| Kind | ing | after 30 minutes | after 60 minutes | after 90 minutes | σ 2 | σ 7 | σ 28 |
| Comparison | | | | | | | |
| — | 18.4 | 13.2 | 10.8 | — | — | 173 | 298 |
| Present Invention | | | | | | | |
| (G) | 18.8 | 20.5 | 20.7 | — | 36.3 | 313 | 398 |
| (H) | 18.0 | 19.8 | 19.5 | — | 8.5 | 283 | 373 |

Note
*% by weight of the effective NSF salt based on cement

The embodiments of the invention in which an exclusive property or privilege is claimed are defined as follows:

1. A cement additive comprising solid granules, the individual granules comprising water-reducing agent deposited on or adhered to a solid carrier which carrier is compatible with hydraulic cement, said water-reducing agent being composed principally of naphthalenesulfonic acid/formaldehyde high molecular weight condensate, or salt thereof, and being effective for preparing a hydraulic cement composition, said cement additive having been formed by molding into granules a mixture consisting essentially of from 12 to 87 parts by weight of said condensate and from 88 to 13 parts by weight of CaO, together with water necessary for granulation.

2. A cement additive as set forth in claim 1, wherein the particle size of said granules is in the range of from 0.3 to 40 mm.

3. A cement composition comprising hydraulic cement, water, the cement additive as claimed in claim 1, claim 2 or, and, optionally, aggregate for concrete, said composition containing from 0.2 to 2.0 wt. % of said additive, calculated as said condensate, based on the weight of said hydraulic cement.

4. A cement additive comprising solid granules, the individual granules comprising water-reducing agent deposited on or adhered to a solid carrier which carrier is compatible with hydraulic cement, said water-reducing agent being composed principally of naphthalene sulfonic acid/formaldehyde high moelcular weight condensate, or salt thereof, and being effective for preparing a hydraulic cement composition, said cement additive having been formed by molding into granules a mixture consisting essentially of from 12 to 87 parts by weight of said condensate, from 44 to 7 parts by weight of CaO, and from 44 to 6 parts by weight of clay, together with water necessary for granulation.

5. A cement additive in the form of granules, said granules having been prepared by mixing an aqueous solution containing from 12 to 87 parts by weight of unneutralized naphthalene sulfonic acid/formaldehyde high molecular weight condensate and from 88 to 13 parts by weight of CaO and obtaining from the mixture, granules comprising a calcium salt of said condensate mixed with $Ca(OH)_2$, $CaSO_4.\frac{1}{2}H_2O$ and $CaSO_4.2H_2O$.

6. A cement additive as set forth in claim 5, in which the mixture consists essentially of said aqueous solution and said CaO, and said granules consist essentially of said calcium salt of said condensate mixed with Ca- $(OH)_2$, $CaSO_4.\frac{1}{2}H_2O$ and $CaSO_4.2H_2O$ formed in situ by reaction between said CaO, said unneutralized condensate and water.

7. A cement additive in the form of granules, said granules having been prepared by mixing an aqueous solution containing from 12 to 87 parts by weight of unneutralized naphthalene sulfonic acid/formaldehyde high molecular weight condensate, from 44 to 7 parts by weight of CaO and from 44 to 6 parts by weight of clay and obtaining from the mixture, granules comprising a calcium salt of said condensate mixed with $Ca(OH)_2$, $CaSO_4.\frac{1}{2}H_2O$, $CaSO_4.2H_2O$ and clay.

8. A cement additive as set forth in claim 7, in which the mixture consists essentially of said aqueous solution, said CaO and said clay, and said granules consist essentially of said calcium salt of said condensate and said clay mixed with $Ca(OH)_2$, $CaSO_4.\frac{1}{2}H_2O$ and $CaSO_4.2H_2O$ formed in situ by reaction between said CaO, said unneutralized condensate and water.

* * * * *

UNITED STATES PATENT AND TRADEMARK OFFICE
CERTIFICATE OF CORRECTION

PATENT NO. : 4,345,944

DATED : August 24, 1982

INVENTOR(S) : Yoshiteru Kazama et al

It is certified that error appears in the above-identified patent and that said Letters Patent is hereby corrected as shown below:

Column 12, line 49, change "moelcular" to ---molecular---.

Signed and Sealed this

Fourth Day of October 1983

[SEAL]

Attest:

GERALD J. MOSSINGHOFF

Attesting Officer

Commissioner of Patents and Trademarks